United States Patent
Gallagher

(10) Patent No.: US 12,353,519 B2
(45) Date of Patent: Jul. 8, 2025

(54) DIGITAL RIGHTS MANAGEMENT AUTHORIZATION TOKEN PAIRING

(71) Applicant: ARRIS Enterprises LLC, Suwanee, GA (US)

(72) Inventor: Karl M. Gallagher, Londonderry (GB)

(73) Assignee: ARRIS Enterprises LLC, Suwanee, GA (US)

( * ) Notice: Subject to any disclaimer, the term of this patent is extended or adjusted under 35 U.S.C. 154(b) by 1168 days.

(21) Appl. No.: 16/837,854

(22) Filed: Apr. 1, 2020

(65) Prior Publication Data

US 2020/0320178 A1    Oct. 8, 2020

Related U.S. Application Data

(60) Provisional application No. 62/828,737, filed on Apr. 3, 2019.

(51) Int. Cl.
| | | |
|---|---|---|
| *G06F 21/10* | (2013.01) | |
| *H04L 9/32* | (2006.01) | |
| *H04N 21/835* | (2011.01) | |

(52) U.S. Cl.
CPC .......... *G06F 21/105* (2013.01); *H04L 9/3213* (2013.01); *H04L 9/3263* (2013.01); *H04N 21/835* (2013.01)

(58) Field of Classification Search
CPC .. H04L 63/0807; G06F 21/41; G06Q 20/3821
See application file for complete search history.

(56) References Cited

U.S. PATENT DOCUMENTS

| | | | |
|---|---|---|---|
| 9,614,829 B1 * | 4/2017 | Molina-Markham | |
| | | | H04L 63/08 |
| 10,356,053 B1 * | 7/2019 | Zubovsky | H04L 63/0428 |
| 11,303,627 B2 * | 4/2022 | Maria | H04L 63/0853 |
| 2010/0185869 A1 | 7/2010 | Moore et al. | |
| 2013/0152221 A1 | 6/2013 | Yin et al. | |
| 2013/0167253 A1 | 6/2013 | Seleznev et al. | |
| 2014/0047566 A1 | 2/2014 | Kidron | |
| 2016/0077901 A1 | 3/2016 | Roth et al. | |
| 2016/0077902 A1 | 3/2016 | Feng et al. | |

(Continued)

OTHER PUBLICATIONS

PCT International Search Report & Written Opinion, RE: Application No. PCT/US2020/026239 dated Jun. 29, 2020.

(Continued)

*Primary Examiner* — Steven S Kim
*Assistant Examiner* — Sima Asgari
(74) *Attorney, Agent, or Firm* — Chernoff, Vilhauer, McClung & Stenzel, LLP

(57) ABSTRACT

A method and apparatus for providing a license to a client device, the license providing a key for decrypting a content instance. In one embodiment, the method comprises accepting a license request, the license request including a client identifier and an access token having an access token identifier and key request data comprising a content identifier identifying the content instance, determining if the received access token identifier is currently bound to a stored client device identifier, and temporarily binding the received access token identifier with the received client device identifier and providing the received access token for validation or returning an error without providing the received access token for validation depending upon the determination.

17 Claims, 7 Drawing Sheets

(56) References Cited

U.S. PATENT DOCUMENTS

2017/0111338 A1*  4/2017  Malatesha ........... H04L 63/0807
2017/0192803 A1   7/2017  Martori et al.
2018/0115544 A1*  4/2018  Feng ................... H04L 63/0807
2019/0052621 A1*  2/2019  Sahraei ................ H04L 63/10

OTHER PUBLICATIONS

Search Report in European Patent Application No. 20785168.4-1218, dated Nov. 25, 2022.

* cited by examiner

DIGITAL RIGHTS MANAGEMENT AUTHORIZATION TOKEN PAIRING

CROSS-REFERENCE TO RELATED APPLICATIONS

This application claims benefit of U.S. Provisional Patent Application No. 62/828,737, entitled "DRM AUTHORIZATION TOKEN PAIRING," by Karl Michael Gallagher, filed Apr. 3, 2019, which application is hereby incorporated by reference herein.

BACKGROUND

1. Field

The present disclosure relates to systems and methods for securely providing content to client devices and in particular to a system and method for managing access tokens provided in the course of such secure provision of content.

2. Description of the Related Art

Digital Rights Management (DRM) systems are known in the art. DRM systems control access to proprietary content using a variety of technologies. Typically, the content is encrypted using one or more encryption keys, and decrypted using one or more corresponding decryption keys by the device that provides the content for consumption or transmission elsewhere. Private data communicated between the client device and the headend is typically used to request and receive specific content encryption keys for protected media being consumed by the client.

Typically, a DRM system requires a means of identifying and authorizing a particular client device. To accomplish this, the device must be authenticated. That is, the client device must be able to demonstrate that it is the device it claims to be. To support such authentication, a root of trust may be provided at the client device. As the name implies, the root of trust is a secure data or algorithm in a cryptographic system that is presumed to be trusted. The root of trust can be used to derive other cryptographic assets such as content decryption keys and the like. If such content keys are compromised, new keys can be generated using the root of trust.

Authentication is typically performed by use of derived public/private keys to be used to generate and issue digital signatures, and application of cryptographic routines on private data that the DRM system wishes to send to remote server hosts. By applying the reverse cryptographic approach, the server can both uniquely identify a specific device platform and also verify that an authentic DRM client device is currently running and made the request.

DRM systems also may require means for identifying and authorizing a particular user or subscriber, for example, to provide higher level entitlement access control and other business critical features to such users or subscribers. This is normally a solution that requires 3rd party augmentation (for example, using digital certificates or other authentication means from a certificate authority (CA)) on top of any existing DRM scheme.

Such authentication means can include access tokens provided on a one time only basis (usable for only one media program or one segment or chunk of a media program) or issued on a limited time basis (usable for a specific. One time only access tokens offer greater resilience to potential sharing and replay attacks, but such access tokens need be replenished often, thus impacting communications between the client device and the entity providing the tokens, which may interrupt service. Limited time access tokens help reduce such problems, but at the risk of tokens being shared among clients, allowing unauthorized clients to access protected content.

SUMMARY

To address the requirements described above, this document discloses a system and method for providing a license to a client device, the license providing a key for decrypting a content instance. In one embodiment, the method comprises accepting a license request, the license request including a client identifier and an access token having an access token identifier and key request data comprising a content identifier identifying the content instance, determining if the received access token identifier is currently bound to a stored client device identifier, and temporarily binding the received access token identifier with the received client device identifier and providing the received access token for validation or returning an error without providing the received access token for validation depending upon the determination. In one embodiment, binding the received access token identifier with the received client device identifier and providing the received access token for validation or returning an error without providing the received access token for validation depending upon the determination comprises temporarily binding the received access token identifier with the received client device identifier and providing the received access token for validation if the received access token identifier is not currently bound to a stored client device identifier, determining if the received access token identifier is currently bound to a different client device identifier than the received client device identifier of the license request if the received access token identifier is currently bound to a stored client device identifier, returning an error without providing the received access token for validation if the received access token identifier is currently bound to a different client device identifier than the received client device identifier of the license request, and providing the received access token for validation if the received access token identifier is currently bound to the received client device identifier of the license request.

Another embodiment is evidenced by an apparatus having a processor and a communicatively coupled memory storing processor instructions for performing the foregoing operations.

The features, functions, and advantages that have been discussed can be achieved independently in various embodiments of the present invention or may be combined in yet other embodiments, further details of which can be seen with reference to the following description and drawings.

BRIEF DESCRIPTION OF THE DRAWINGS

Referring now to the drawings in which like reference numbers represent corresponding parts throughout.

DESCRIPTION

Figure 1:
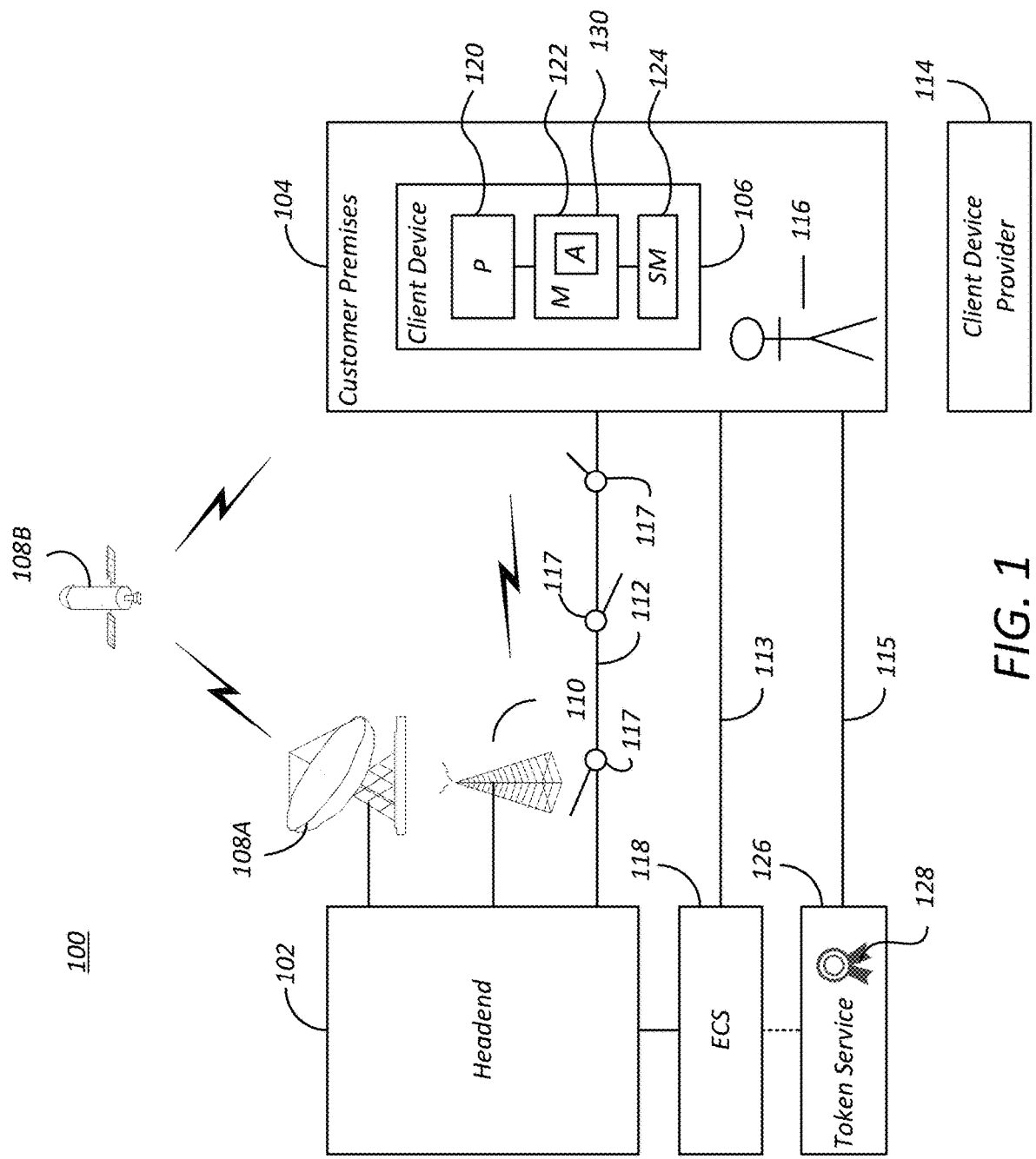
FIG. 1 is a diagram of an exemplary content distribution network.

In the following description, reference is made to the accompanying drawings which form a part hereof, and which is shown, by way of illustration, several embodiments. It is understood that other embodiments may be utilized and structural changes may be made without departing from the scope of the present disclosure.

Overview

One of the methods that can be used to provide user authorization services is to bind a custom access token from a third party to DRM private data for each request. For instance, in a solution for over the top (OTT) content delivery (e.g. via the open Internet), the hypertext transfer protocol (HTTP) standard allows for encoding access token data in custom headers or uniform resource identifier (URI) string query parameters. The access token may be requested from a remote resource as part of the normal playback workflows implemented within an application executing on the client device.

An authentication protocol is used to control the initial dissemination of access tokens with an access token instance only representing an ephemeral (e.g. temporary) authorization for a specific service. The access tokens are not bound to the client device in any way, nor do they provide means for reauthenticating the end-user/subscriber. An exemplary authentication protocol is OAUTH, which is an open standard for access delegation, allowing Internet entities to access their information on other websites, without providing other more primitive authenticating information such as passwords.

In such a system, a new access token is typically acquired for every streaming session initiated by the client device, and the access token is validated by the DRM entitlement server for each license request, before fulfilling the request.

Typically the issued access token is protected using means analogous to those used to protect DRM private data-encryption of data to prevent access and digital signatures for providing a means for validating at the receiving client device to assure the client device is the client device it purports to be.

Access tokens may be a categorized at a high level as being One-Time-Only (OTO), in which case the individual token instance may only be used once, or time-bound, were a token may be reused multiple times within a defined validity period. OTO access tokens provide greater resilience to potential sharing and replay attacks at the expense of requiring a higher churn rate of access token generation, since each client device must always retrieve a new access token for each key request the client device must request.

Time-limited (TL) access tokens can be used to encode information that authorizes a client device to access a specific protected content instance (or set of content instances). This access is typically unrestricted within the time span encoded into the token, and after such time span has expired, access rights are revoked or no longer usable to access content.

TL access tokens (as opposed to OTO access tokens) are useful in several aspects. First, they permit predelivery of access tokens, and allow rights acquisition to be temporally decoupled from with playback. Second, they reduce the communication and processing load on servers responsible for creation and dissemination of access tokens. Third, TL tokens simplify the handling of complex client use-cases involving asynchronous retrieval of an arbitrary number of encryption keys during playback, (thus also necessitating reaffirmation of entitlement status) i.e. forced renewal, rotation of content encryption keys. In contrast, in such use cases, OTP access tokens require an arbitrary number of access tokens to be requested, which is not feasible in some implementations.

To provide the advantages of TL access tokens with reduced risk associated with potential sharing and replay attacks, the methods and systems described below provide a server side data store that 'pins' or binds access token instances to the physical client device that initially requests access to content using that access token. This is achieved via storing a DRM system provided unique client device identifier against a unique access token identifier. Since the key information required here is cryptographically protected, the solution is resilient to tampering. The data store pining may be implemented as a limited duration cache as the binding only needs to last for as long as the maximum access token duration allowed by the system. The access token is bound to a physical device using a just-in-time model (e.g. token granted when upon request for a content instance, and for more than one-time-only use, yet resistant to fraudulent use. Binding information is stored for every unique combination of access token identifier and client device identifier.

Content Distribution System

FIG. 1 is a diagram of an exemplary content distribution network (CDN) 100. The CDN 100 comprises content source or headend 102. The headend 102 may be a multi system operator (MSO) that transmits content to a client devices 106 in possession of end users 116 (subscribers) or a content provider that generates content and transmits the content to client devices 106 in possession of MSOs (for eventual transmission to end users). Exemplary client devices 106 include set top boxes (STBs), cable modems, and integrated receiver/decoders (IRDs), but may also be embodied in smart phones, tablet computers, desktop computers, laptop computers, or any device capable of receiving, storing, retransmitting, or presenting content. Client devices 106 are alternatively referred to as customer provided equipment (CPEs) in the following disclosure.

The client device 106 includes the processor 120 communicatively coupled to a typically volatile and random access memory 122 and a non-volatile memory 124, which may be a secure memory. Typically, the client device 106 is installed in the customer premises 104 such as a home or MSO facility, but the client device 106 may be installed in motor vehicle or be carried on the user's person.

In many instances, the client devices 106 provided to the users 116 are manufactured (at least in part) by a client device provider 114. In some embodiments, the client device provider 114 manufactures client devices 106 of one hardware design that can be used with different headends 102, each having different functional requirements. Typically, this is accomplished through modification of the software and/or firmware of the client device 106. The client device provider 114 may also manufacture client devices 106 with different hardware functionality for different headends 102.

Typically, the content and private data transmitted between the headend 102 and the client devices 106 is encrypted or otherwise obfuscate it to protect it from being received by unauthorized entities. Consequently, CDNs 100 typically include a conditional access system (CAS) in which content is encrypted by the headend 102 before transmission to client devices 106, and the client devices 106 decrypt the data transmitted by the headend 102. Client devices 106 may also have the capability to encrypt data transmitted from the client device 106 to the headend 102.

The headend 102 may transmit data via a wired network 112 that includes a plurality of communication nodes 117 interconnected by optical cable or conductive wire. The headend 102 may also transmit data via a wireless connection such as via a terrestrial transmitter 110 or a satellite broadcast system in which data is transmitted via a ground station 108A and a satellite 108B.

In some cases, the CDN 100 also permits the users' client device 106 to transmit information to the headend 102 or an entitlement control service (ECS) 118 such as license server. Accordingly, the CDN 100 permits information to be transceived (e.g. transmitted and received) by the headend 102 and ECS 118, and the client device 106. Further, such communication between systems may be asymmetric, with data being transmitted from the headend 102 to the client device 106 via one transmission method, and data being transmitted from the client device 106 to the headend 102 or ECS 118 by another transmission method. For example, it is known for headends 102 to transmit content to subscribers 116 having a client device 106 via satellite 108, but data to be transmitted from the client device 106 to the headend 102, ECS 118 or token service 126 to be transmitted via a communication links such as 112, 113 or 115. The token service 126 may include, for example, a token issuer 126A that issues access token(s) 128 and a token validator 126B, that validates access tokens 128 as described further herein.

For example, the client device 106 may require updated encryption keys (required to decrypt content) when requesting such content or on an occasional basis. In such instances, the client device 106 establishes a secure communication channel with the entitlement control service (ECS) 118 via communication link 113 to obtain a license having such encryption keys, or a means of generating such encryption keys. As a part of this secure communications channel, the client device 106 and the ECS 118 authenticate one another, to verify that each entity is what they claim to be. This is typically accomplished by the exchange of digital certificates signed by a certificate authority (CA) or in intermediate entity. Accordingly, the client device 106 is typically provisioned with a digital certificate for this purpose. For security purposes, such digital certificates expire after passage of time, and a new certificate must be generated and issued. Further, in some embodiments, when the client device 106 desires transmission of encrypted content from the headend 102, the client device 106 first obtains an access token 128 from a token service 126, and present the access token 128 along with the request for a license 350, which is presented to the ECS 116.

Figure 2:
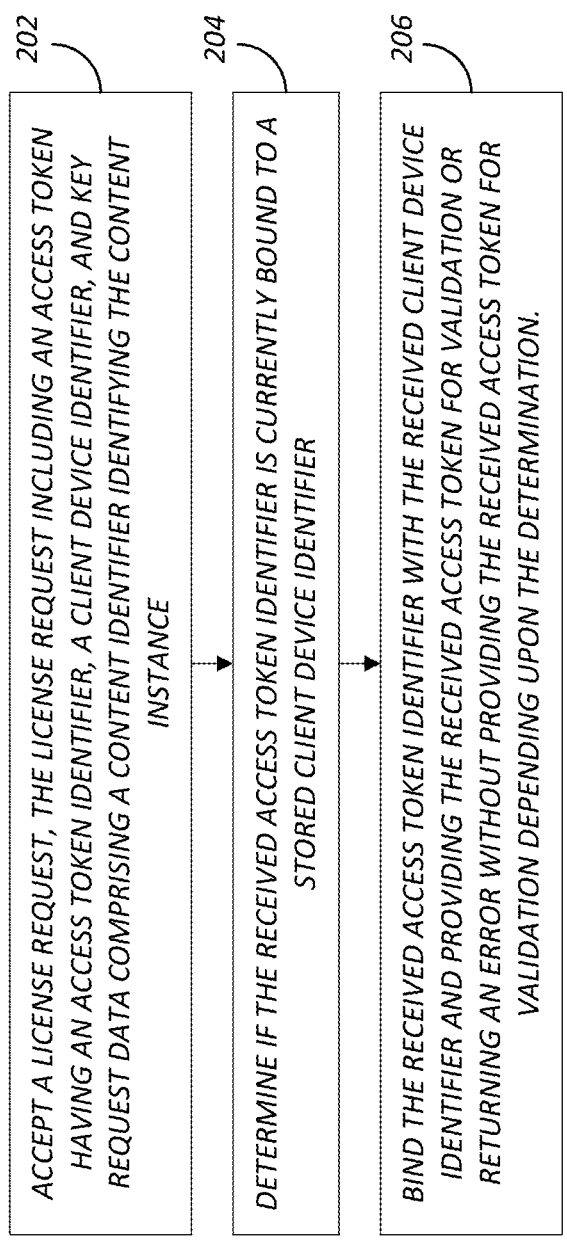
FIG. 2 is a diagram illustrating an illustrative embodiment of providing a license having a key for decrypting a content instance to a client device.

FIG. 2 is a diagram illustrating an illustrative embodiment of providing a license having a key for decrypting a content instance to a client device 106. In block 202, a license request is accepted. The license request includes an access token 128 having an access token identifier, a client device identifier, and key request data comprising a content identifier identifying the content instance. Block 204 determines if the received access token identifier is currently bound to a stored client device identifier. Depending on this determination, block 206 binds the received access token identifier with the received client device identifier and provides the received access token 128 for validation, or returns an error without providing the received access token 128 for validation.

FIGS. 3A-3D are diagrams depicting further details regarding the operations depicted in FIG. 2. In block 302, the client device 106 generates a request for a license 350 to receive and decrypt content provides the license request to a DRM application 130 executing on the client device 106. The license request comprises a set of data from the DRM application 130 including the client device credentials, which includes a unique device identifier (device ID), an identifier of the requested content (content ID). In block 304, the DRM application 130 generates a request for an access token 128, and transmits that access token 128 request to a token issuer 126A of the token service 126. The access token request comprises the client device 106 credentials, including the device ID, the content ID, and optionally, a desired time for which the access token 128 will be valid.

In block 306, the access token request is received, and in block 308, the access token 128 is generated. The access token includes an access token ID. The access token ID may be presented in a header of the access token, or may be the data payload. In one embodiment, the token ID is provided in a plaintext (e.g. non-encrypted) portion of the access token 128, but the signature of the both the token header and the token payload is made and provided as a part of the token, to assure the token ID is not tampered with.

In one embodiment, the token is JavaScript Object Notation (JSON) token defined by RFC 7519, which is incorporated by reference herein. JSON web token (JWT) is an open standard that defines a compact and self-contained way to securely transmit information between parties as a JSON object.

The JWT may be incorporated as the payload of a JSON Web Signature object (JWS) [RFC 7515], in which case the information it contains can be digitally signed, typically using a secret (for example, using the HMAC algorithm) or a public/private key pair using RSA or ECDSA. JWTs can alternatively be both encrypted and digitally signed if incorporated as the plaintext of a JSON Web Encryption object OWE) [RFC 7516]. JWE allows for use of AES AEAD (Authenticated Encryption with Associated Data) modes to enable simultaneous encryption and digital signature computation from a private symmetric key (for example using AES-GCM [Galois Counter Mode] The integrity of the data within a signed JWTs can be verified, while encrypted JWTs hide the data from other parties. When tokens are signed using public/private key pairs (or symmetric keys with AES AEAD), the signature verifies that only the parting holding the private key is the entity that signed the JWT. JWTs are useful in authorization and information exchange contexts. With respect to authorization, each request from an entity to access services or resources includes a JWT specifying the service or resources the client is permitted to access. With respect to information exchange, the JWT provide a means for securely transmitting information between parties. Since JWTs can be signed, the entity receiving a request with the token can be assured that the entity making the request is properly identified, and that the contents have not been tampered with.

In compact form, a JWT includes a number portions separated by a dot (.). They include a header, a payload, and a signature and in the case of encrypted JWT an encrypted key and initialization vector. For example, the compact form of a signed JWT can be expressed as "xxxxx.yyyyy.zzzzz", where "xxxxx" represents the header, "yyyyy" represents the payload, and "zzzzz" represents the signature. Alternatively, the compact form of an encrypted JWT can be expressed as "xxxx.kkkk.iiii.yyyy.zzzz," where in addition, "kkkk" represents and encrypted AES key and "iiii" represents the AES initialization vector.

The header typically includes the type of token and an indication of the signing and encryption algorithms in use. The payload includes the claims, which are statements about the entity in possession of the token (client device ID) the token itself (access token ID), and additional data. There are three types of claims: registered claims, public claims, and private claims. Registered claims are selected from pre-defined claims which are not mandatory, but recommended. They include information such as the issuer, the expiration time of the token, the subject, and the audience. Public claims can be defined at will by users, but are usually selected to be consistent with a JWT registry to avoid collisions. Private claims are custom claims created to share information between parties that agree on using them and the protocol and formats for doing so. The third portion of the JWT is the signature. The header (potentially encrypted) and the payload (also potentially encrypted) is combined and signed according to a secret (or private key) using the algorithm specified in the header.

Returning to FIG. 3A, the generated access token 128 is transmitted to the DRM application 130, as shown in block 310. The DRM application 130 receives the access token 128, and generates a license request, as shown in blocks 312 and 314. The license request has key request data, which includes the identifier of the requested content (content ID), the client device ID, and cryptographic data required to authenticate and/or protect the privacy of the license request. In one embodiment, the access token 128 is appended to the license request rather than included with the license request, as that solution does not require changes into popular current application program interfaces. In block 316, the DRM application 130 transmits the generated license request to the ECS 118.

In block 318, the ECS 118 receives the license request and access token 128. In embodiments in which the license request is encrypted (e.g. via a secure web socket and the like), the license request is decrypted. The license request is also validated by using a private key to generate a signature of the decrypted data and comparing the generated signature with the signature provided with the license request. Similarly, the appended access token 128 may be decrypted and authenticated before use. Block 320 determines if the access token identifier (access token ID) is currently bound to a stored client device identifier.

If the received access token ID is not currently bound to a stored client device ID, processing is routed to block 322, which binds the received access token ID with the client ID received in the license request. This can be accomplished by storing a value that binds the received token ID with the received client ID, or by storing the token ID and client ID in a way that binds them together. For example, the token ID may be concatenated with the client ID, and the result hashed and stored. In later operations where the operations of block 320 are again performed with a new license request, a hash of the token ID and client ID of the new license request can be generated and compared. In the case where the client ID and token ID are simply relationally stored (e.g. storing one in a database and using that database to look up the other), the operations of block 320 are again performed with a new license request by taking either the client ID or the token ID and looking up the other.

In one embodiment, the binding of the access token ID and the client device ID is temporary (e.g. temporally limited to a maximum temporal key duration). The bond between the access token ID and the client device ID can be broken by actively breaking the bond according to a schedule (for example, when the decryption key obtained using the token is set to expire), or by storing the bond between the access token ID and the client device ID such that the stored bond is automatically written over or erased. For example, in binding information may be stored in a memory cache or a first-in-first-out (FIFO) memory, such that formerly stored binding information is lost and written over by new binding information at a period approximating that of the life of the decryption keys granted using the access token 128.

Returning to FIG. 3B, after the client ID and the token ID are bound, the access token 128 is transmitted to a token validator 126B, as shown in block 324. The token validator receives the access token 128, decrypts the access token (if encrypted), and validates the token (determines whether the access token is valid using the content ID, and token ID) as shown in block 326. If access token 128 is valid, the token validator 126B transmits a message to the ECS 118 indicating that the token is valid. The ECS may then generate a license 350 to consume the content identified by the content ID (which includes the keys or other cryptographic information required to retrieve and decrypt the content), and transmit that license 350 to the DRM application 130 as shown in blocks 338 and 340.

If block 328 determines that the access token 128 is not valid, processing is passed to blocks 330, 332 and 334, in which an error is transmitted from the token validator 126B to the ECS 118 and thence to the DRM application 130. In this case, since no license 350 with a decryption key is provided, the client device 106 will not receive and cannot decrypt the content.

In the foregoing embodiment, the entitlement(s) to receive and decrypt the content is determined by the ECS 118 and the ECS generates the license 350 itself. Other embodiments in which the token validator 126B determines such entitlement(s) and generates the license 350, or in which entitlement(s) are determined by one entity and the license 350 generated by the other of these two entities are also envisioned.

Figure 3A:
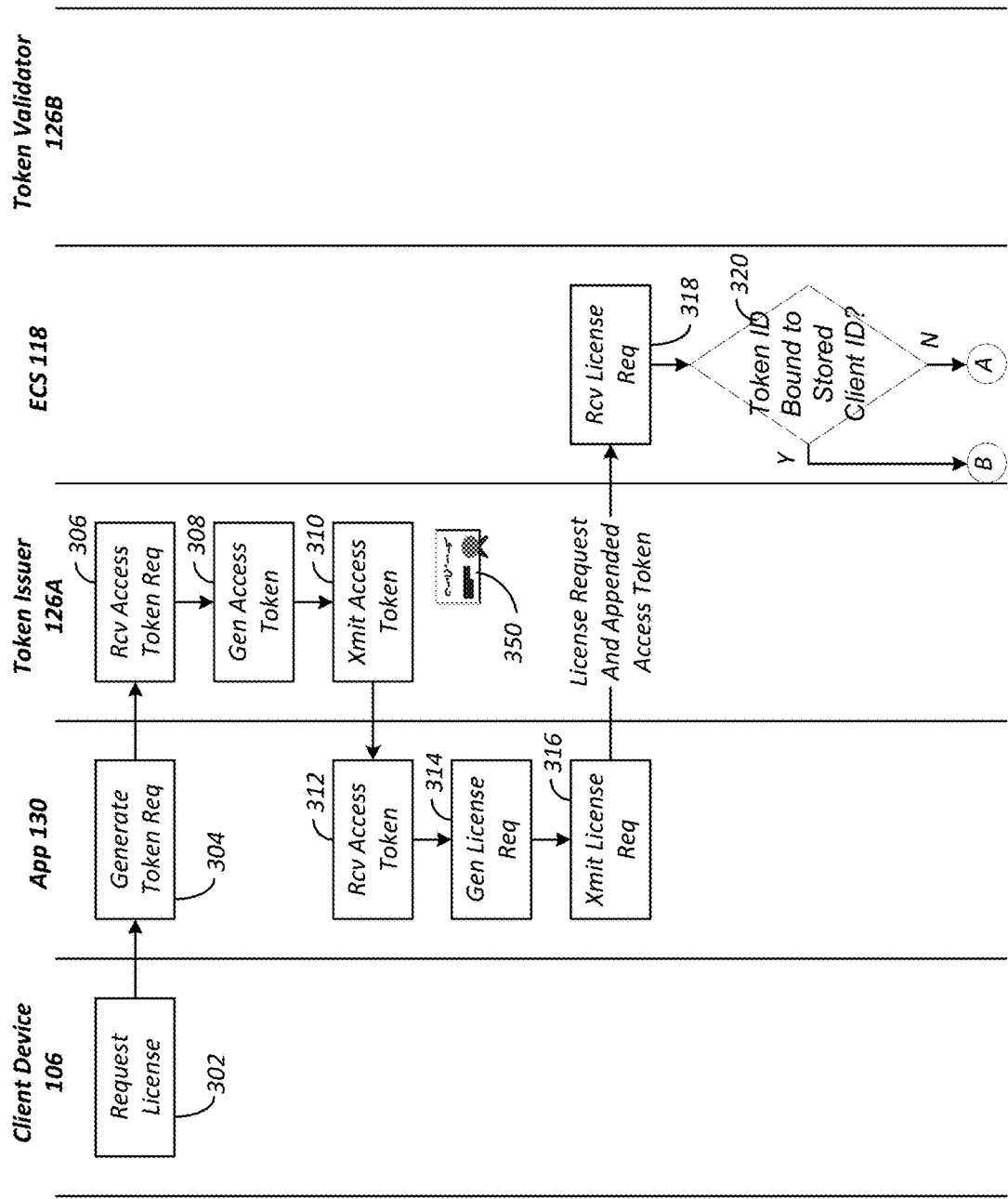
FIGS. 3A-3D are diagrams depicting further details regarding the operations depicted in FIG. 2.
Figure 3B:
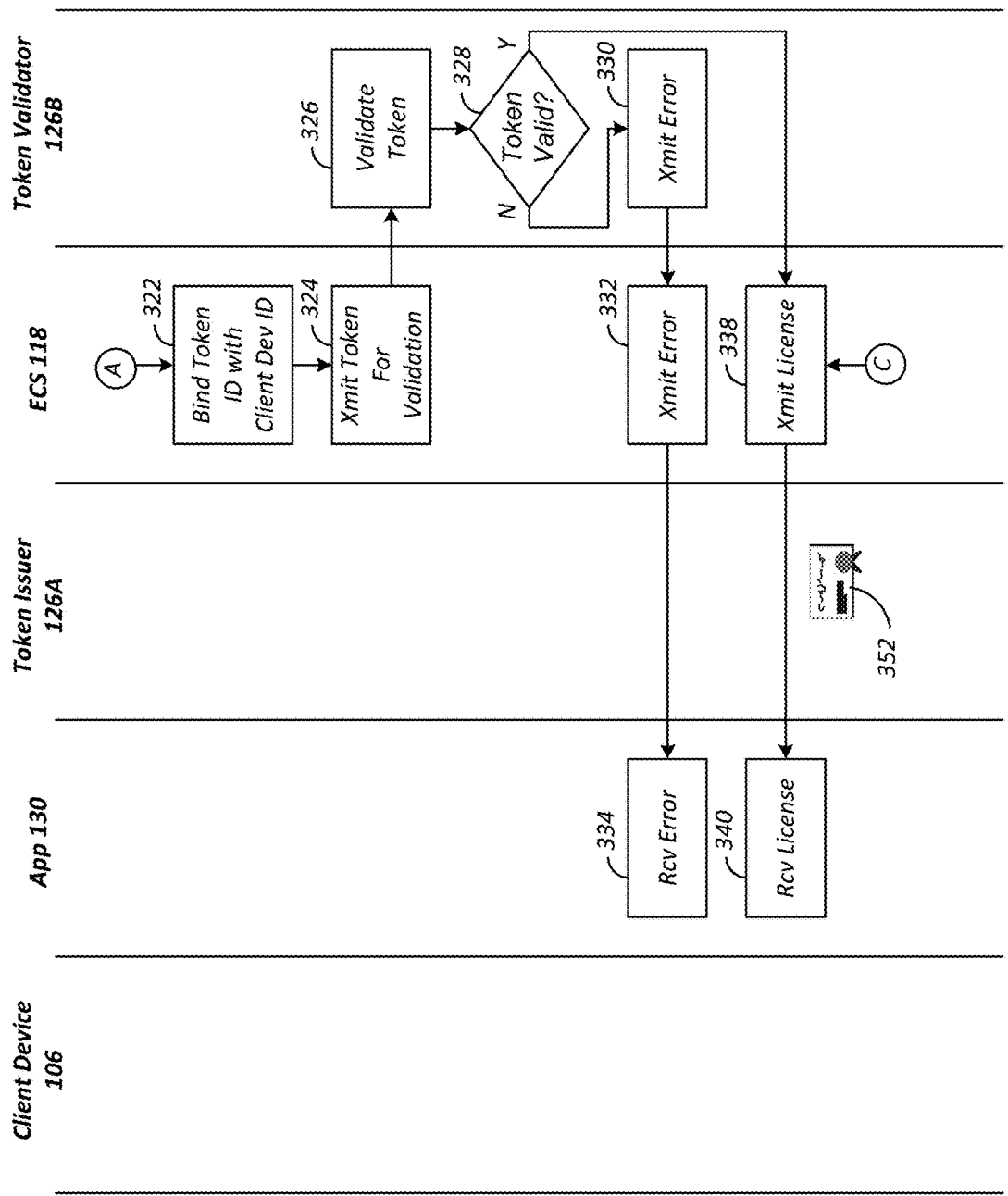
Figure 3C:
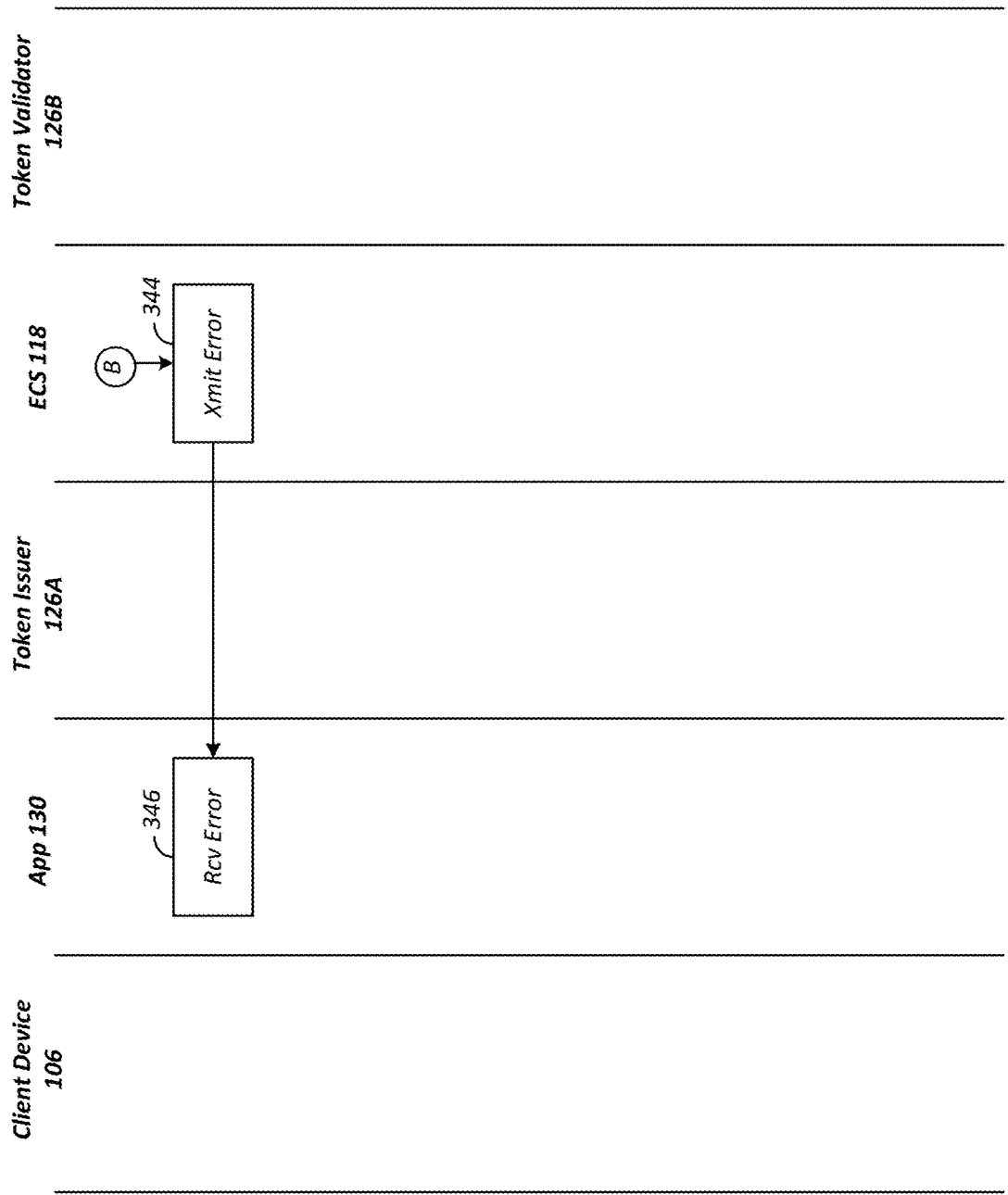

Returning to block 320 of FIG. 3A, if it is determined that the token ID is already bound to a stored client ID, processing is routed to block 344 of FIG. 3C, which transmits an error back to the DRM application 130. Since tokens are valid for a limited time, if a client device 106 had requested an access token 128 and the user 116 had provided that access token 128 to another client device 106 so that the another client device 106 might use that token to request and obtain access to the same content instance, this attempt is thwarted by the above processing.

Figure 3D:
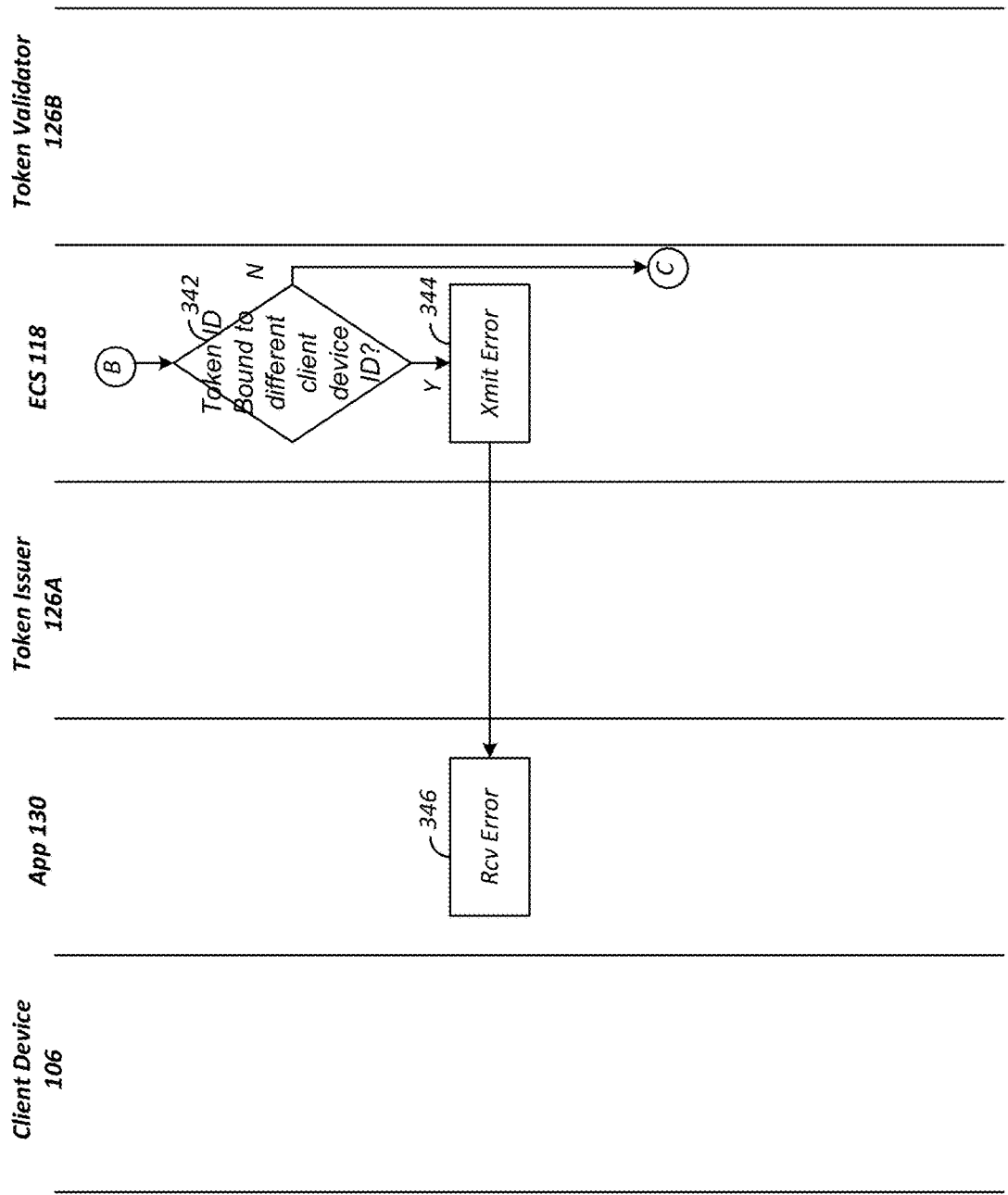

FIG. 3D is a diagram of an alternative embodiment of the technique for providing a license 350 to the client device 106. In this embodiment, if block 320 tests positive (e.g. the access token ID is already bound to a client ID), processing is routed to decision block 342, which determines if the token ID is bound to a different client device ID. If the access token ID is bound to a different client device ID, it can be determined that the license request is being made by a client device 106 other than the client device 106 that originally requested and received the access token 128, and that an attempt is being made to use the same access token 128 among more than one client device 106. Accordingly, in this case, processing is routed to block 3751944, which transmits an error message, and block 346, in which the DRM application 130 receives the error message. However, if the access token is bound to the same client device ID, this is an indication that the same client device has made the license request, and processing is routed to block 338, to transmit the license 350 to the DRM application 130. This allows a client device 106 that has been restarted or which otherwise needs the license 350 to be redistributed to obtain such a license 350.

Hardware Environment

Figure 4:
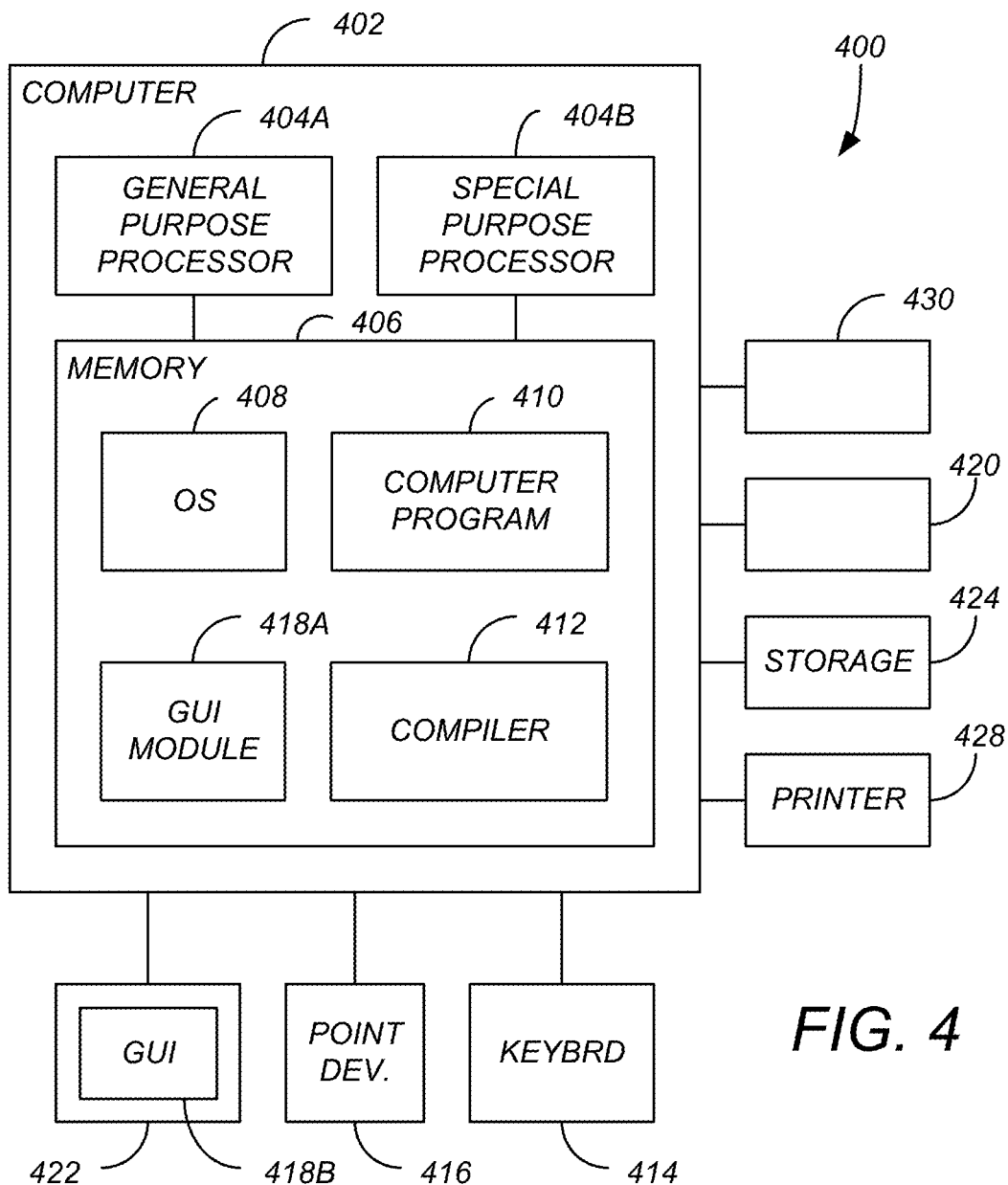
FIG. 4 illustrates an exemplary computer system that could be used to implement processing elements of this disclosure.

FIG. 4 illustrates an exemplary computer system 400 that could be used to implement processing elements of the above disclosure, including the headend 102, ECS 118, the token service 128, or client device 106. The computer 402 comprises a processor 404 and a memory, such as random access memory (RAM) 406. The computer 402 is operatively coupled to a display 422, which presents images such as windows to the user on a graphical user interface 418B. The computer 402 may be coupled to other devices, such as a keyboard 414, a mouse device 416, a printer 428, etc. Of course, those skilled in the art will recognize that any combination of the above components, or any number of different components, peripherals, and other devices, may be used with the computer 402.

Generally, the computer 402 operates under control of an operating system 408 stored in the memory 406, and interfaces with the user to accept inputs and commands and to present results through a graphical user interface (GUI) module 418A. Although the GUI module 418B is depicted as a separate module, the instructions performing the GUI functions can be resident or distributed in the operating system 408, the computer program 410, or implemented with special purpose memory and processors. The computer 402 also implements a compiler 412 which allows an application program 410 written in a programming language such as COBOL, C++, FORTRAN, or other language to be translated into processor 404 readable code. After completion, the application 410 accesses and manipulates data stored in the memory 406 of the computer 402 using the relationships and logic that was generated using the compiler 412. The computer 402 also optionally comprises an external communication device such as a modem, satellite link, Ethernet card, or other device for communicating with other computers.

In one embodiment, instructions implementing the operating system 408, the computer program 410, and the compiler 412 are tangibly embodied in a computer-readable medium, e.g., data storage device 420, which could include one or more fixed or removable data storage devices, such as a zip drive, floppy disc drive 424, hard drive, CD-ROM drive, tape drive, etc. Further, the operating system 408 and the computer program 410 are comprised of instructions which, when read and executed by the computer 402, causes the computer 402 to perform the operations herein described. Computer program 410 and/or operating instructions may also be tangibly embodied in memory 406 and/or data communications devices 430, thereby making a computer program product or article of manufacture. As such, the terms "article of manufacture," "program storage device" and "computer program product" as used herein are intended to encompass a computer program accessible from any computer readable device or media.

Those skilled in the art will recognize many modifications may be made to this configuration without departing from the scope of the present disclosure. For example, those skilled in the art will recognize that any combination of the above components, or any number of different components, peripherals, and other devices, may be used.

The foregoing discloses an apparatus, method and system for providing a license to a client device in which the license provides a key for decrypting a content instance. In one embodiment, the method includes accepting a license request, the license request including a client identifier and an access token having an access token identifier and key request data including a content identifier identifying the content instance, determining if the received access token identifier is currently bound to a stored client device identifier, and temporarily binding the received access token identifier with the received client device identifier and providing the received access token for validation or returning an error without providing the received access token for validation depending upon the determination.

Implementations may include one or more of the following features:

Any of the methods described above, wherein temporarily binding the received access token identifier with the received client device identifier and providing the received access token for validation or returning an error without providing the received access token for validation depending upon the determination includes: if the received access token identifier is not currently bound to a stored client device identifier: temporarily binding the received access token identifier with the received client device identifier and providing the received access token for validation; and if the received access token identifier is currently bound to a stored client device identifier: returning an error without providing the received access token for validation.

Any of the methods described above, wherein determining if the received access token has been validated; if the received access token has not been validated, returning an error without providing the key, and if the received access token has been validated, returning the key for decrypting the content instance identified by the content identifier.

Any of the methods described above, wherein binding the received access token identifier with the received client device identifier and providing the received access token for validation includes: temporarily binding the received access token identifier with the received client device identifier and providing the received access token for validation.

Any of the methods described above, wherein binding the received access token identifier with the received client device identifier includes associatively storing the received access token identifier and the received client device identifier.

Any of the methods described above, wherein the key is characterized at least in part by a maximum temporal key duration; and the received access token identifier is bound with the received client device identifier for only the maximum temporal key duration.

Any of the methods described above, wherein the received access token identifier and the received client device identifier are associatively stored in a first-in-first-out (FIFO) memory cache. The method wherein the received access token is a JavaScript object notation (JSON) access token appended to a license request.

Any of the methods described above, wherein the JSON access token includes a signature of data including at least access token identifier; and the method further includes verifying the token identifier according to the signature; and returning the error to the client device if the token identifier is not verified.

Another embodiment is evidenced by a an apparatus for providing a license to a client device, the license providing a key for decrypting a content instance. The apparatus comprises a processor; a memory, communicatively coupled to the processor, the memory including processor instructions including processor instructions for: accepting a license request, the license request including a client identifier and an access token having an access token identifier and key request data including a content identifier identifying the content instance; determining if the received access token identifier is currently bound to a stored client device identifier; and temporarily binding the received access token identifier with the received client device identifier and providing the received access token for validation or returning an error without providing the received access token for validation depending upon the determination.

Any apparatus described above, wherein the instructions for temporarily binding the received access token identifier with the received client device identifier and providing the received access token for validation or returning an error without providing the received access token for validation depending upon the determination include instructions for: temporarily binding the received access token identifier with the received client device identifier and providing the received access token for validation if the received access token identifier is not currently bound to a stored client device identifier; and returning an error without providing the received access token for validation if the received access token identifier is currently bound to a stored client device identifier.

Any apparatus described above, further including: determining if the received access token has been validated; returning an error without providing the key if the received access token has not been validated; and returning the key for decrypting the content instance identified by the content identifier if the received access token has been validated.

Any apparatus described above, wherein the instructions for binding the received access token identifier with the received client device identifier and providing the received access token for validation include instructions for: temporarily binding the received access token identifier with the received client device identifier and providing the received access token for validation.

Any apparatus described above, wherein the instructions for binding the received access token identifier with the received client device identifier include instructions for associatively storing the received access token identifier and the received client device identifier.

Any apparatus described above, wherein the key is characterized at least in part by a maximum temporal key duration; and the received access token identifier is bound with the received client device identifier for only the maximum temporal key duration.

Any apparatus described above, wherein the received access token identifier and the received client device identifier are associatively stored in a first-in-first-out (FIFO) memory cache. The apparatus wherein the received access token is a JavaScript object notation (JSON) access token appended to a license request.

Any apparatus described above, wherein the JSON access token includes a signature of data including at least access token identifier; and the instructions further include instructions for: verifying the token identifier according to the signature; and returning the error to the client device if the token identifier is not verified.

Any apparatus described above, wherein the instructions for binding the received access token identifier with the received client device identifier, and providing the received access token for validation or returning an error without providing the received access token for validation depending upon the determination includes: temporarily binding the received access token identifier with the received client device identifier and providing the received access token for validation if the received access token identifier is not currently bound to a stored client device identifier; determining if the received access token identifier is currently bound to a different client device identifier than the received client device identifier of the license request if the received access token identifier is currently bound to a stored client device identifier; returning an error without providing the received access token for validation if the received access token identifier is currently bound to a different client device identifier than the received client device identifier of the license request; and providing the received access token for validation if the received access token identifier is currently bound to the received client device identifier of the license request. The apparatus may also include digital rights management authorization token pairing.

CONCLUSION

This concludes the description of the preferred embodiments of the present disclosure. The foregoing description of the preferred embodiment has been presented for the purposes of illustration and description. It is not intended to be exhaustive or to limit the disclosure to the precise form disclosed. Many modifications and variations are possible in light of the above teaching. It is intended that the scope of rights be limited not by this detailed description, but rather by the claims appended hereto.

What is claimed is:

1. A method of providing a key to a client device for decrypting and displaying a content instance on the client device, the method comprising:
   receiving a request from the client device, the request including a client device identifier and an access token having an access token identifier and key request data comprising a content identifier identifying the content instance;
   determining that the received access token identifier is currently not bound to a stored client device identifier;
   based upon the determination, modifying the access token to temporarily bind the received access token identifier with the received client device identifier and providing the modified access token to a token validator for validation; and
   upon validation by the token validator, delivering the key to the client device.

2. The method of claim 1, further comprising:
   determining if the received access token has been validated;
      if the received access token has not been validated, returning an error without providing the key; and
      if the received access token has been validated, returning the key for decrypting the content instance identified by the content identifier.

3. The method of claim 2, wherein binding the received access token identifier with the received client device identifier and providing the received access token for validation comprises:
   temporarily binding the received access token identifier with the received client device identifier and providing the received access token for validation.

4. The method of claim 3, wherein:
   binding the received access token identifier with the received client device identifier comprises associatively storing the received access token identifier and the received client device identifier.

5. The method of claim 4, wherein:
   the key is characterized at least in part by a maximum temporal key duration; and the received access token identifier is bound with the received client device identifier for only the maximum temporal key duration.

6. The method of claim 4, wherein the received access token identifier and the received client device identifier are associatively stored in a first-in-first-out (FIFO) memory cache.

7. The method of claim 4, wherein the received access token is a JavaScript object notation (JSON) access token appended to a license request.

8. The method of claim 7, wherein:
the JSON access token includes a signature of data including at least access token identifier; and
the method further comprises
verifying the token identifier according to the signature; and
returning the error to the client device if the token identifier is not verified.

9. The method of claim 1, wherein:
binding the received access token identifier with the received client device identifier and providing the received access token for validation or returning an error without providing the received access token for validation depending upon the determination comprises:
if the received access token identifier is not currently bound to a stored client device identifier:
temporarily binding the received access token identifier with the received client device identifier and providing the received access token for validation;
if the received access token identifier is currently bound to a stored client device identifier:
determining if the received access token identifier is currently bound to a different client device identifier than the received client device identifier of the license request;
if the received access token identifier is currently bound to a different client device identifier than the received client device identifier of the license request, returning an error without providing the received access token for validation; and
if the received access token identifier is currently bound to the received client device identifier of the license request, providing the received access token for validation.

10. An apparatus for providing a key to a client device for decrypting a content instance on the client device, the method comprising:
a processor;
a memory, communicatively coupled to the processor, the memory comprising processor instructions including processor instructions for:
receiving a request from the client device, the request including a client device identifier and an access token having an access token identifier and key request data comprising a content identifier identifying the content instance;
determining that the received access token identifier is currently not bound to a stored client device identifier;
based upon the determination, modifying the access token to temporarily bind binding the received access token identifier with the received client device identifier and providing the modified access token to a token validator for validation; and
upon validation by the token validator, delivering the key to the client device.

11. The apparatus of claim 10, further comprising:
determining if the received access token has been validated;
returning an error without providing the key if the received access token has not been validated; and
returning the key for decrypting the content instance identified by the content identifier if the received access token has been validated.

12. The apparatus of claim 11, wherein the instructions for binding the received access token identifier with the received client device identifier and providing the received access token for validation comprise instructions for:
temporarily binding the received access token identifier with the received client device identifier and providing the received access token for validation.

13. The apparatus of claim 12, wherein:
the instructions for binding the received access token identifier with the received client device identifier comprise instructions for associatively storing the received access token identifier and the received client device identifier.

14. The apparatus of claim 13, wherein:
the key is characterized at least in part by a maximum temporal key duration; and
the received access token identifier is bound with the received client device identifier for only the maximum temporal key duration.

15. The apparatus of claim 13, wherein the received access token identifier and the received client device identifier are associatively stored in a first-in-first-out (FIFO) memory cache.

16. The apparatus of claim 13, wherein the received access token is a JavaScript object notation (JSON) access token appended to a license request.

17. The apparatus of claim 10, wherein:
the instructions for binding the received access token identifier with the received client device identifier and providing the received access token for validation or returning an error without providing the received access token for validation depending upon the determination comprises:
temporarily binding the received access token identifier with the received client device identifier and providing the received access token for validation if the received access token identifier is not currently bound to a stored client device identifier;
determining if the received access token identifier is currently bound to a different client device identifier than the received client device identifier of the license request if the received access token identifier is currently bound to a stored client device identifier;
returning an error without providing the received access token for validation if the received access token identifier is currently bound to a different client device identifier than the received client device identifier of the license request; and
providing the received access token for validation if the received access token identifier is currently bound to the received client device identifier of the license request.

* * * * *